United States Patent [19]
Sato et al.

[11] Patent Number: 5,039,831
[45] Date of Patent: Aug. 13, 1991

[54] CIRCUIT BREAKER

[75] Inventors: Minori Sato, Hitachi; Kastuichi Kashimura, Takahagi; Masanori Tsukushi, Hitachi; Yukio Kurosawa, Hitachi; Kazuhiro Saito, Hitachi; Osamu Koyanagi, Hitachi; Isao Nishida, Hitachi, all of Japan

[73] Assignee: Hitachi, Ltd., Tokyo, Japan

[21] Appl. No.: 328,559

[22] Filed: Mar. 24, 1989

[51] Int. Cl.⁵ .......................................... H01H 33/16
[52] U.S. Cl. ......................... 200/144 AP; 200/148 R
[58] Field of Search ..................... 200/144 AP, 148 R

[56] References Cited
U.S. PATENT DOCUMENTS 4,636,599  1/1987  Talir .......................... 200/144 AP
4,709,294  11/1987  Kim ........................... 200/144 AP

Primary Examiner—Robert S. Macon
Attorney, Agent, or Firm—Antonelli, Terry, Stout & Kraus

[57] ABSTRACT

In a circuit breaker in which an interrupting device, a resistor device and a capacitor device are connected in parallel, a shield device is arranged to shield the interrupting device and the resistor device and comprises a first shield for shielding the stationary main contact and stationary resistor contact and a second shield for shielding the movable main contact and movable resistor contact. Each of the first shield and the second shield comprises a large shield portion and a small shield portion, and the small shield portions are arranged between the large shield portions. The small shield portion terminates in the vicinity of the top of the main contact and of the top of the resistor contact. The small shield portion comprises wide portions situated substantially in the direction of an axis joining centers of the main contact and resistor contact and narrow portions situated substantially in the direction perpendicular to the axis. The width of the narrow portions is smaller than the width of the wide portions, and at least a part of the capacitor device is arranged over the narrow portions.

In the circuit breaker, since the capacitor device is arranged over the narrow portions, the space for arranging the capacitor device is larger than the conventional circuit breaker, the arrangement of the isoelectric liens is not disturbed or disordered locally in the vicinity of the top of the shield of the stationary main contact and in the vicinity of the movable main contact and high dielectric strength between the main contacts is obtained.

6 Claims, 10 Drawing Sheets

CIRCUIT BREAKER

BACKGROUND OF THE INVENTION AND RELATED ART STATEMENT

Figure 18:
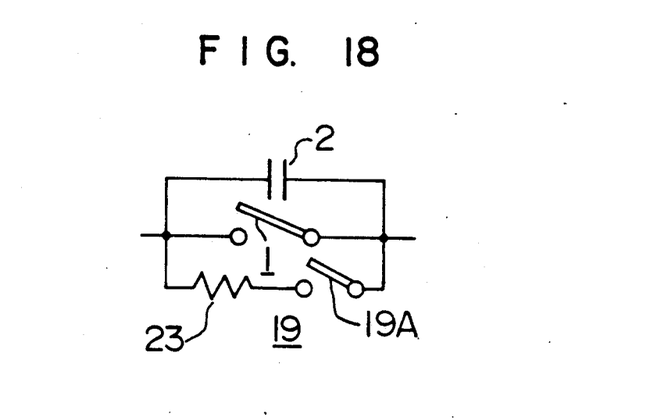
FIG. 18 is a circuit diagram of a gas circuit breaker having a device.

The present invention relates to a gas circuit breaker of grounded-tank type, particularly, a gas circuit breaker of grounded-tank type which has an interrupting device, a resistor device and a capacitor device, and in which the interrupting device, the resistor device and the capacitor device are connected in parallel A conventional gas circuit breaker for high voltage and large current has interrupting devices 1 and impedance devices each of which is connected with the interrupting device in parallel as shown in FIG. 18. The conventional impedance device has a capacitor device for decreasing a transient recovery voltage of the interrupting device 1 and for dividing appropriately the voltage of the gas circuit breaker among the interrupting devices 1, and a resistor device 19 which has a resistor element 23 and a resistor contact 19A to decrease a surge during connecting.

A main interrupting device and so forth are contained in a cylindrical container (grounded tank) which is filled with insulating gas such as SF6 gas having high dielectric strength and arc-extinguishing efficiency. Since the high dielectric strength and arc-extinguishing efficiency of this kind of gas is obtained in uniform electric field strength, the interrupting device is covered by a shield cylinder and the shield cylinder faces on an inner surface of the grounded tank so that an insulation between the interrupting device and the grounded tank is maintained. Therefore, the structure arranged in the shield cylinder is important for decrease of a diameter of the grounded tank. The conventional gas circuit breaker has the interrupting device 1 which includes a fixed contact and a movable contact moving away from or to the fixed contact in a direction parallel to the axis of the grounded tank to interrupt or flow the current, the capacitor device 2 and the resistor device 19 which includes the resistor element 23 and the resistor contact 19A, all of the interrupting device, the capacitor device and the resistor device are contained compactly in a cylindrical shield having a large diameter at the area of the interrupting device and the arrangement of the devices are designed appropriately so that the whole of the interrupting device is effectively inspected. (Refer to Japanese Examined Patent Publication No. 57-21819 and Japanese Unexamined Patent Publication No. 60-25123.) In such circuit breakers, an opening for inspecting the interrupting device is arranged at a surface of the tank facing on the main interrupting device 1 and the capacitor device 2, the resistor element and elements relating thereto are not arranged between the interrupting device 1 and the opening for inspection. In new gas circuit breaker, the voltage interrupted by the main interrupting device increases and the number of the elements constituting the interrupting device for interrupting one phase decreases, for example, the number of the interrupting device per phase in the circuit breaker for 550 kV is one.

There are following problems for constructing the circuit breaker with one interrupting device per phase and for increasing dielectric strength for high voltage. For instance, in order to construct the circuit breaker with one interrupting device per phase, the capacitor device having the dielectric strength corresponding to the dielectric strength of the conventional circuit breaker including two interrupting devices per phase must be arranged in the circuit breaker including one interrupting device per phase. Since the transient recovery voltage is interrupted by one interrupting device, quadruple space for containing the capacitor device is necessary in comparison with the circuit breaker including two interrupting device so that the rising rate of the transient recovery voltage is sufficiently decreased. Further, in order to increase the dielectric strength, the local electric field strength must be decreased. But since the distance between the fixed side cylindrical shield covering the main fixed contact and the fixed resistor contact and the movable side cylindrical shield covering the main movable contact and the movable resistor contact is substantially equal to the distance between the contacts of the interrupting device, there is a problem that the length of the capacitor device is more than three times as long as the distance between the cylindrical shields. As above mentioned, in the circuit breaker having close distance between the cylindrical shields. Since isoelectric liens are extended or arranged by the capacitor device, there is a problem that the local electric field strengths increase between the point of the shield of the fixed main contact and the point of the movable main contact and between the ends of the cylindrical shields facing to each other. If a distance between the interrupting device and the capacitor device and/or a distance between the capacitor device and the shields are increased in order to decrease the deflection of the isoelectric liens extended by the capacitor device, the outer diameters of the cylindrical shields are increased, so that the size of the circuit breaker is increased.

OBJECT AND SUMMARY OF THE INVENTION

The object of the present invention is to provide a grounded-type small gas circuit breaker for high voltage and large current which has the shields with small diameters and has sufficient space for containing the capacitor device.

According to the present invention, the circuit breaker comprises an interrupting device, a capacitor device, a resistor device, a shield device and a grounded tank, the interrupting device, the resistor device and the capacitor device connected in parallel, the grounded tank containing the interrupting device, the capacitor device, the resistor device and the shield device, the interrupting device comprising a stationary main contact and a movable main contact, the resistor device comprising a stationary resistor contact and a movable resistor contact, the stationary main contact, the stationary resistor contact and an end of the capacitor device connected to each other, the movable main contact, the movable resistor contact and the other end of the capacitor device connected to each other, the shield device comprising a first shield for shielding the stationary main contact and stationary resistor contact and a second shield for shielding the movable main contact and movable resistor contact, each of the first shield and the second shield comprising a large shield portion and a small shield portion, the small shield portions arranged between the large shield portions, the small shield portion terminating in the vicinity of the top of the main contact and of the top of the resistor contact, the small shield portion comprising wide portions situated substantially in the direction of an axis joining centers of the main contact and resistor contact and narrow portions situated substantially in the direction perpendicular to the axis, the width of the narrow portions being smaller than the width of the wide portions, at least a part of the capacitor device arranged over the narrow portions.

In the circuit breaker according to the present invention, since the capacitor device is arranged over the narrow portions, the space for arranging the capacitor device is larger than the conventional circuit breaker, the arrangement of the isoelectric lines is not disturbed or disordered in the vicinity of the top of the shield of the stationary man contact and in the vicinity of the movable main contact and high dielectric strength between the main contacts is obtained without changing largely radiuses of curvature of the terminating tops of the small shield portions facing to each other and covering the main contacts respectively.

DETAILED DESCRIPTION OF PREFERRED EMBODIMENT

Figure 1:
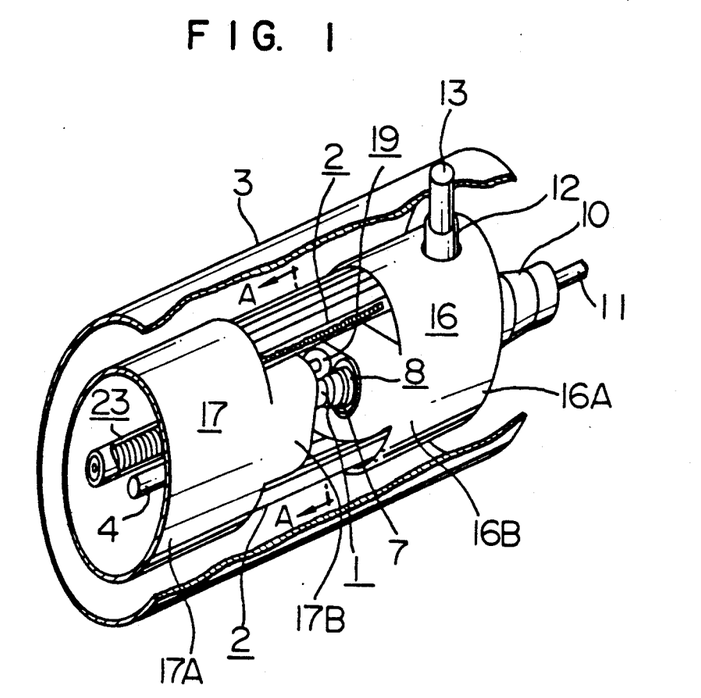
FIG. 1 is a partially cross sectioned perspective view of a grounded-tank-type gas circuit breaker of the invention.
Figure 2:
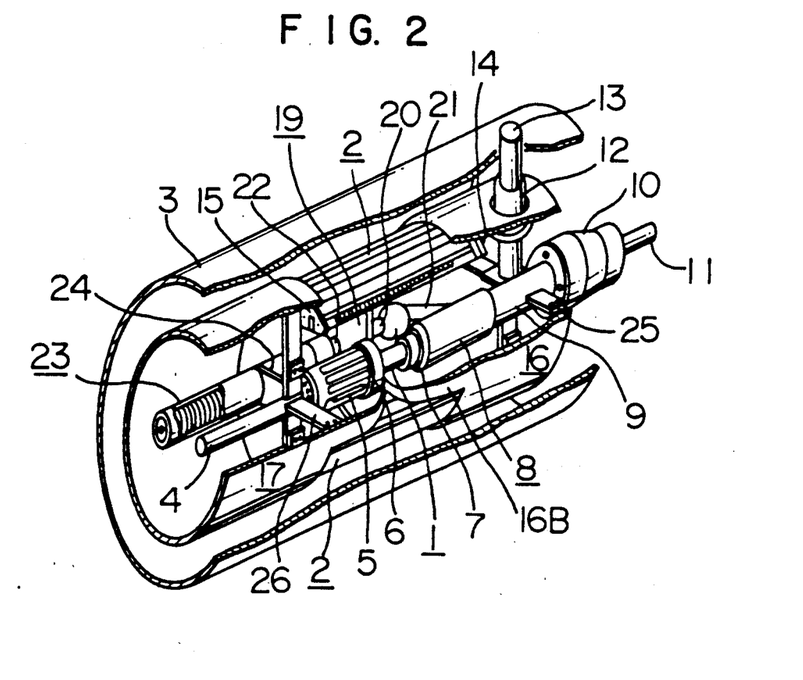
FIG. 2 is a partially cross-sectioned perspective view showing more in detail the inner structure of the grounded-tank-type gas circuit breaker of the invention.

An embodiment of the present invention in FIGS. 1 and 2 is a gas circuit breaker having a well known puffer type interrupting device. A hermetically sealed grounded tank 3 is arranged horizontally, which tank is filled with SF6 gas having good arc-extinguishing and insulating characteristics, and which tank contains devices of the gas circuit breaker in the gas. The interrupting device, a capacitor device and a resistor device including a resistor element 23 and resistor contacts are appropriately arranged in the grounded tank 3. The interrupting device has a stationary interrupting device and a movable interrupting device. In FIG. 1 and 2, the stationary interrupting device 1 is arranged in left side of the grounded tank 3, and the movable interrupting device 1 is arranged in right side of the grounded tank 3. The fixed main contact 5 and a shield 6 for preventing electric field strength from concentrating are arranged on a to of a fixed conductor element 4 which is insulated from, is supported in the tank 3 and is connected with a conductor (not shown). An insulated support cylinder 10 is supported in the tank 3 at an end of the insulated support cylinder and at another end the insulated support cylinder a bracket 9 is fixed to the insulated support cylinder. To the bracket 9 a current collector 12 connected to a current conductor 13 is attached. An insulating operation rod 11 driven by an operation device (not shown) arranged at the outside of the tank 3 extends through the insulated support cylinder 10 and through the bracket 9 and the insulating operation rod 11 drives a puffer device including an arc contact, a puffer cylinder, piston and an insulating nozzle and drives the movable main contact 7 facing to the stationary main contact 5. The resistor device for connecting has a stationary resistor device and a movable resistor device, the stationary resistor device includes an insulating support 24 attached to the top of the fixed conductor element 4 or to a fixed part of the stationary main contact 5, a resistor element 23 supported by the insulating support 24 and the stationary resistor contact 22 connected to the resistor element 23, and the movable resistor device includes a movable resistor contact 20 facing to the stationary resistor contact 22 and an arm 21 through which the movable resistor contact is supported by the puffer device 8. The resistor device is connected with the interrupting device in parallel. A resistor device for interrupting is similar to the resistor device for connecting. A capacitor device 2 is electrically connected to the resistor device 19 for interrupting or connecting and to the interrupting device 1 in parallel.

The stationary interrupting device and resistor device and the movable interrupting device and resistor device are covered by specially-formed respective shields 16, 17 which are attached with an attaching arm 25 one end of which is fixed to the bracket 9 and with an attaching arm 26 one end of which is fixed to the conductor element 4, as shown in FIG. 2. The shields 16, 17 have cylindrical shields 16A, 17A which cover the greater parts of the stationary and movable interrupting devices respectively as shown in FIGS. 1 and 2 and which face on the inner surface of the tank 3 to decrease electric field strength concentration, and the shields 16, 17 have small shield 16B, 17B which have oval cross-section and which surround the top portions of the interrupting device 1 and resistor device 19 and which face to each other. The cylindrical shields 16A, 17A and the respective small shields 16B, 17B may be integral or be separated for efficiency of assembling. A capacitor device for decreasing the transient recovery voltage of the interrupting device 1 and/or the rising rate of transient recovery voltage thereof and for dividing appropriately the voltage of the circuit breaker is arranged around the small shields between the cylindrical shields and is supported by attaching brackets 14, 15 at the movable side and the stationary side thereof.

Figure 17:
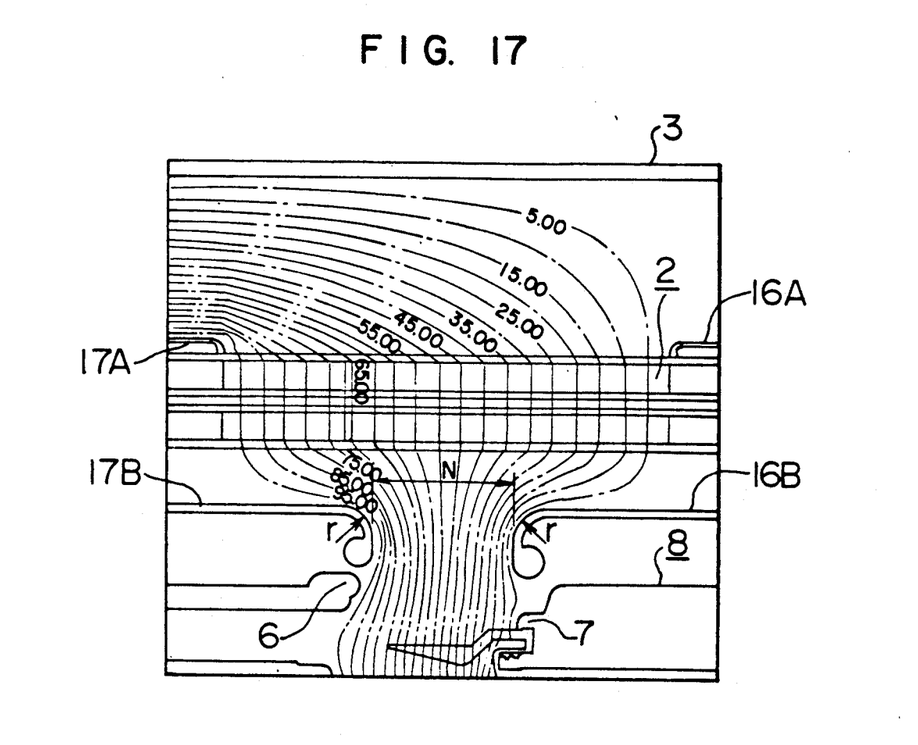
FIG. 17 is a cross-sectional view showing isoelectric lines distributed in the vicinity of main contacts of a grounded-tank-type gas circuit breaker of the invention.

Since the shields 16, 17 surround the movable interrupting device and resistor device and the stationary interrupting device and resistor device respectively and since the capacitor device is arranged over the small shields and the greater part of the capacitor device faces on the grounded tank 3 and the ends of the capacitor device are arranged in the respective cylindrical shields, as shown in FIG. 17, the isoelectric liens are appropriately distributed with the capacitor device 2 in case that a distance N between the tops of the small shields whose tops have a radius of curvature r is substantially equal to a distance between the movable main contact and the stationary main contact. And the isoelectric liens distribute along the radius of curvature r with uniform distance therebetween, so that the local electric field strength is largely decreased in the vicinity of the interrupting device and of the portions of shields facing to each other. Therefore, the size of the interrupting device for high voltage and for large current can be small and the dielectric strength can increase.

Figure 3:
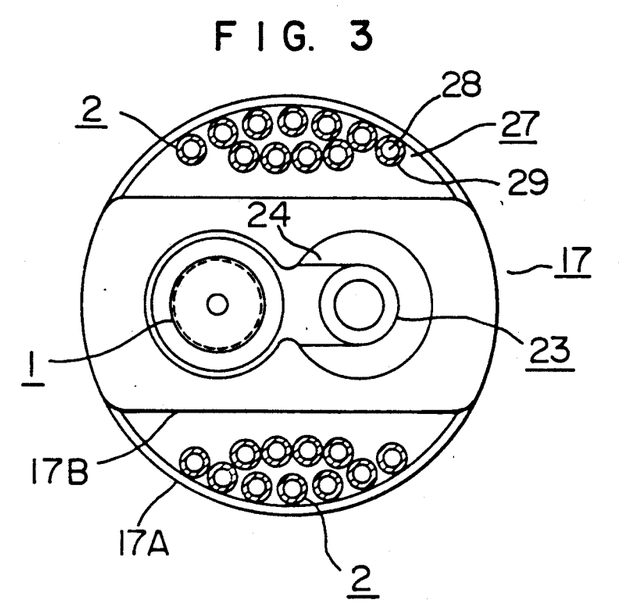
FIGS. 3 to 6 are cross-sectional views taken on line A—A of FIG. 1.

In FIG. 3, the shape of the shield and the arrangement of the capacitor device are shown. As below mentioned, the shield 17 has a cylindrical shield 17A with circular cross section and a substantially oval small shield 17B with plane surfaces. The surface of the small shield 17B has partially a diameter equal to the diameter of the cylindrical shield 17A, the small shield 17B surrounds the tops of the interrupting device 1 and the resistor device 23 and the capacitor device is arranged over the plane surfaces of the small shield. The capacitor device has a plurality of bar-shaped capacitors 27 each of which has a hollow insulating tube 29, a plurality of capacitor elements 28 and connecting parts arranged in the hollow insulating tube. In such arrangement of the shield 17 and capacitor device 2, the interrupting device and the resistor device are inspected or exchanged through an opening arranged on the grounded tank without obstruction of the capacitor device and the concentration of electric field strength in the vicinity of the interrupting device decreases.

In the above embodiment, the capacitor device 2 has a plurality of bar shaped capacitors 27. If the bar-shaped capacitors have the same diameter, assembling is easy. If the bar-shaped capacitors have respective various suitable diameters, the capacitance of the capacitor device is adjusted suitably by selecting the number of various bar-shaped capacitors. Further, the capacitor device with a mold element as mentioned below makes assembling more easy.

Figure 11:
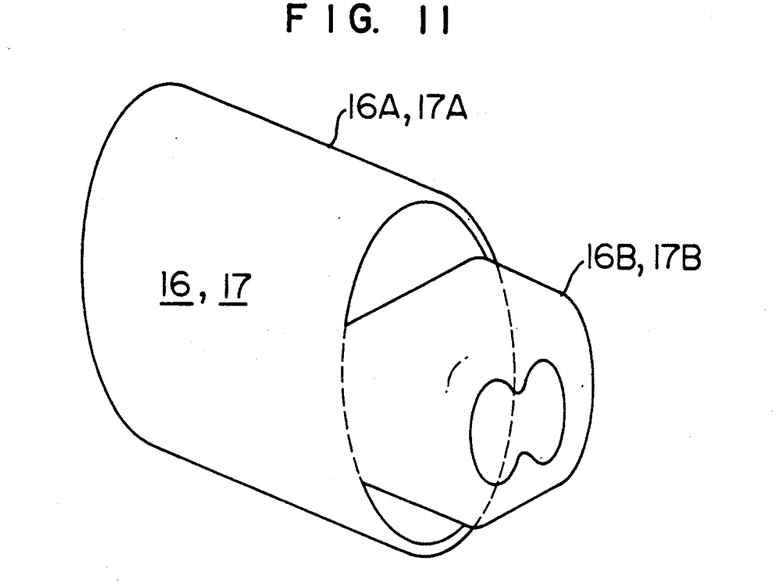
FIG. 11 is a perspective view of a shield used in the grounded-tank-type gas circuit breaker of the invention.

The shields 16, 17 arranged at the movable interrupting device and the stationary interrupting device respectively include the respective cylindrical shields 16A, 17A and the respective substantially oval small shields 16B, 17B. The cylindrical shield and the substantially oval small shield are separately formed and subsequently may be joined integrally as shown in FIG. 11 or assembled. The cylindrical shield and the substantially oval small shield are made of aluminium or of copper or of stainless steal, which materials have good processability. The substantially oval small shield have narrow or small-width portions situated substantially in the direction perpendicular to the axis joining centers of the main contact and resistor contact. The narrow or small-width portions may have plane surfaces or may have slightly circular-arc-shaped surfaces.

Figure 4:
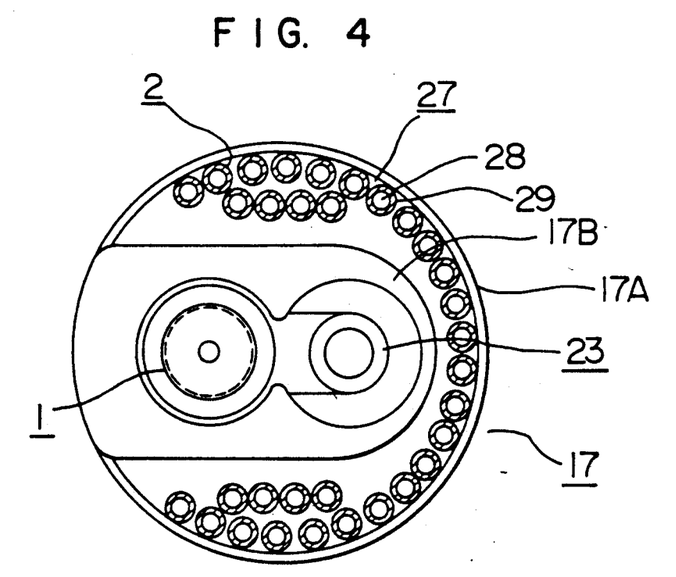
Figure 5:
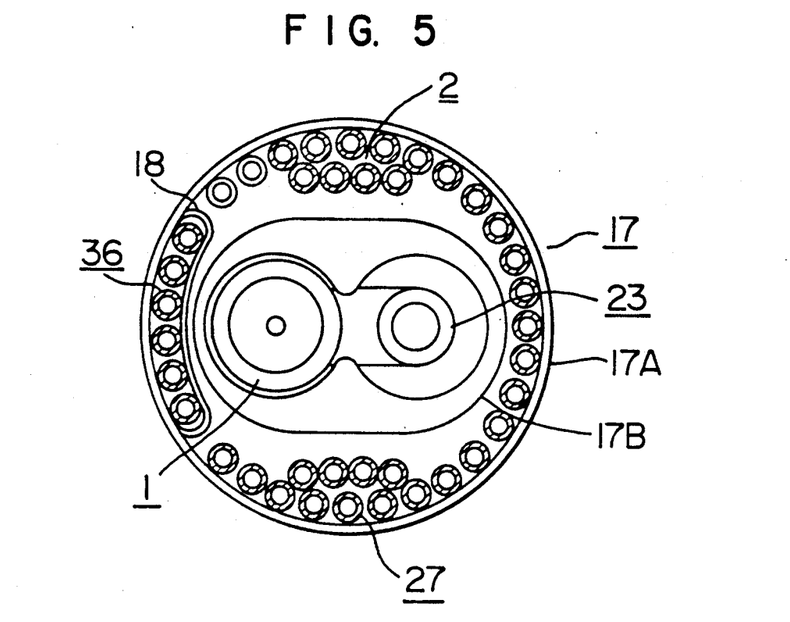
Figure 6:
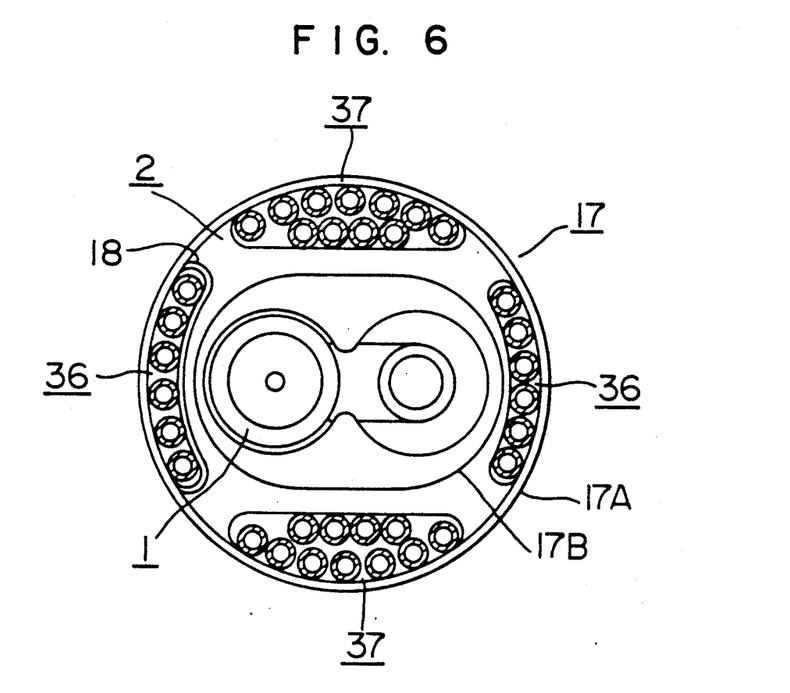

The other arrangement of the shield 17 and the capacitor device 2 is shown in FIGS. 4 to 6. FIG. 4 is different from FIG. 3 in the arrangement of the small shield 17B included in the shield 17. For instance, one of the wide portions of the small shield 17B has a radius substantially equal to the radius of the cylindrical shield 17A, and another of the wide portions of the small shield 17B has a radius smaller than the radius of the cylindrical shield 17A. The capacitor device 2 is also arranged over the above-mentioned smaller radius portion. In such arrangement of the capacitor device, correct adjustment of the capacitance of the capacitor device and decrease of the concentration of electric field strength is improved. In FIGS. 5 and 6, both of the wide portions of the substantially oval shield 17B have radiuses smaller than the diameter of the cylindrical shield 17A, and the capacitor device 2 is arranged over both of the above-mentioned smaller radius portions. In such arrangement of the capacitor device, correct adjustment of the capacitance of the capacitor device and decrease of the concentration of electric field strength is more improved. A circular-arc-shaped unit 36 binding a part of the capacitor device 2 with a band 18 is arranged in the vicinity of the interrupting device 1. When the interrupting device 1 is inspected through the opening of the grounded tank, installation and removal of the circular-arc-shaped unit 36 are permitted. Further, in FIG. 6, two circular-arc-shaped units 36 and two semicylindrical units 37 are arranged symmetrically so that the capacitor device is attached more efficiently.

Figures 7, 8, 9:
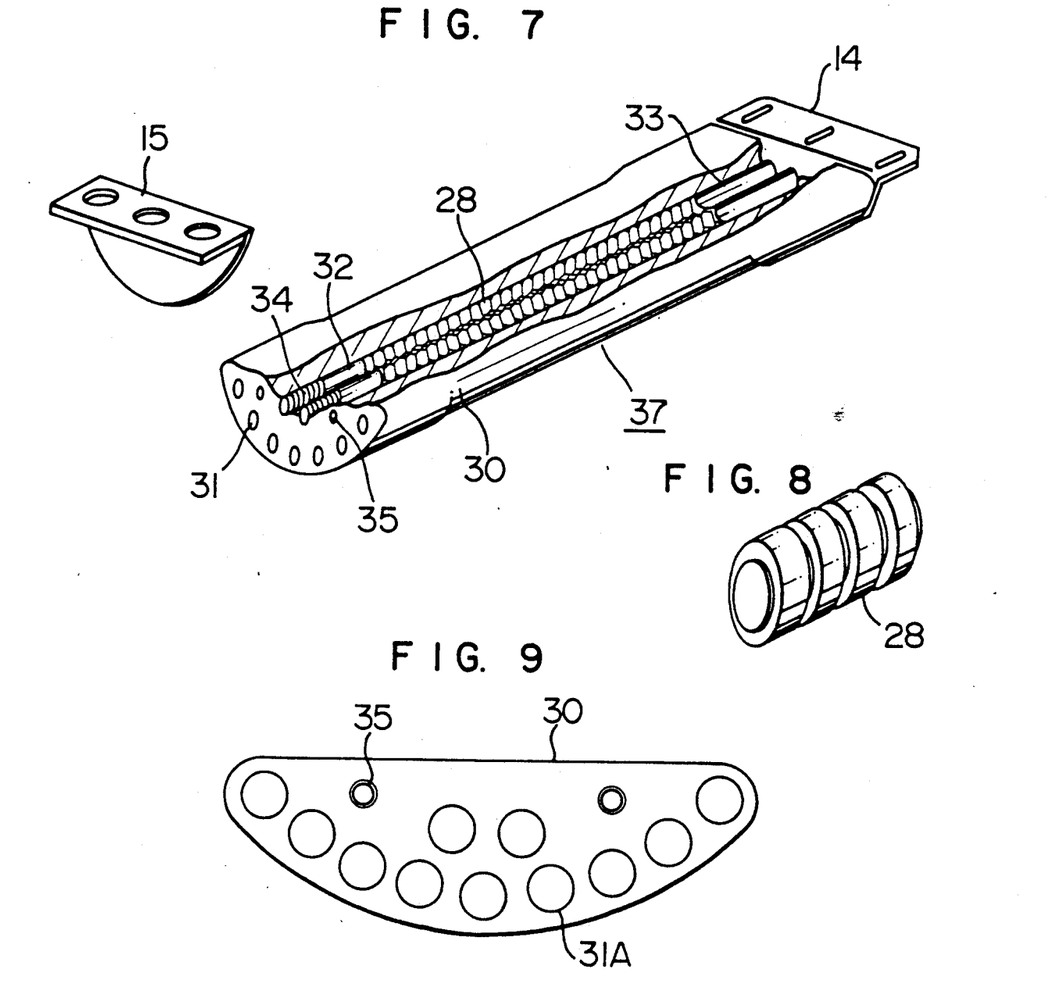
FIG. 7 is a partially cross-sectioned perspective view of a capacitor device used in the grounded-tank-type gas circuit breaker of the invention.
FIG. 8 is a perspective view of stacked capacitor elements.
FIGS. 9 and 10 are side views of different embodiments of the capacitor device used in the grounded-tank-type gas circuit breaker of the invention.
Figure 10:
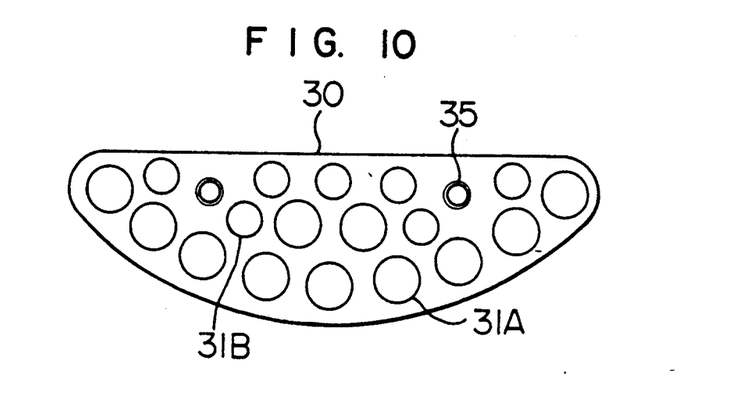

The semicylindrical unit 37 has a plane surface and a semicylindrical surface and is formed as shown in FIGS. 7 to 10. For instance, the semicylindrical unit 37 includes a mold element 30 which has attaching holes 35 at both ends of the element and a plurality of through holes 31 extending through the mold element in the direction parallel to the longitudinal axis of the mold element as shown in FIG. 7 and which is made of epoxy resin or of tetrafluoride-ethylene resin. The through hole 31 receives the bar-shaped capacitor including a hollow insulating tube in which capacitor elements 28, springs 34 for effecting electric connection between the capacitor elements 28 by pressing the capacitor elements 28 and conductor bars 32, 33 situated at respective ends of the bar-shaped capacitor 28 are received in place. The hollow insulating tube may be not used. After the through hole 31 receives the bar-shaped capacitor, attaching metal elements 14, 15 are attached to the mold element through the attaching holes 35 at the ends of the mold element so that the attaching metal elements electrically connect with the capacitor elements 28 arranged in the through holes. The mold element may include a plurality of through holes 31A having the same diameter as shown in FIG. 9 or may include a plurality of through holes 31A, 31B having deferent diameters as shown in FIG. 10. The through holes 31A, 31B receive different capacitors having respective capacitance different from each other. The capacitance of the capacitor device is adjusted by selecting the suitable through holes.

Figure 12:
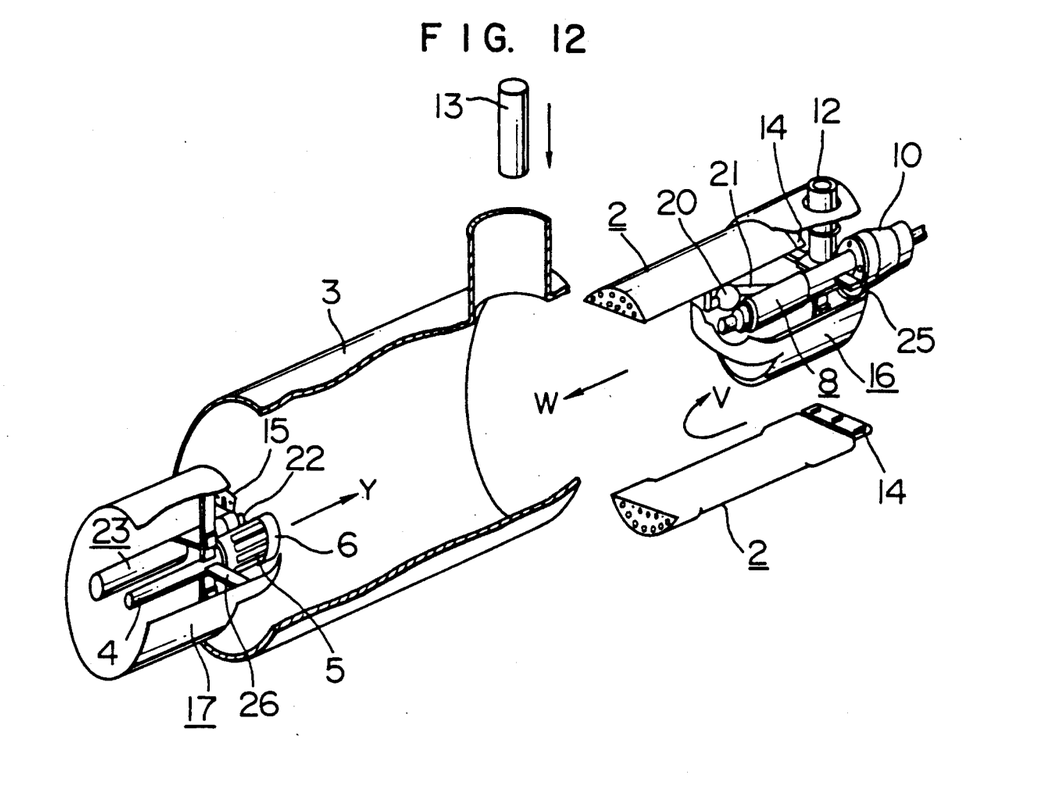
FIG. 12 is a perspective view showing a method for assembling the grounded-tank-type gas circuit breaker of the invention.

The grounded tank type gas circuit breaker of the present invention is assembled as illustrated in FIG. 12. The movable interrupting device and resistor device and the stationary interrupting device and resistor device are assembled separately at the outside of the grounded tank 3. The shield 16, 17 are attached to the movable interrupting device and resistor device and the stationary interrupting device and resistor device respectively. Subsequently, the capacitor device 2 is inserted into the shield 16 covering the movable interrupting device and resistor device, for example, in the direction V as shown in FIG. 12, and is attached to the shield 16 through the metal attaching element 14. The shield 16 covering the movable interrupting device and resistor device and the shield 17 covering the stationary interrupting device and resistor device are inserted into the grounded tank 3 in the respective directions W, Y and are attached to the grounded tank 3 in place. After another end of the capacitor device 2 is attached to the shield 17 through the metal attaching element 15, the current conductor 13 is inserted in and is connected electrically to the current collector 12, and the conductor (not shown) is connected to the fixed conductor element 4. In this embodiment, the current conductor 13 is inserted into the current collector 12 from the upper side of the grounded tank 3, but when the insulated support cylinder 10 is arranged in the radial direction of the grounded tank 3, the current conductor 13 and the current collector 12 are arranged in the axial direction of the grounded tank 3. Instead of the above mentioned assembling method, after the movable interrupting device and resistor device, the stationary interrupting device and resistor device and the capacitor device 2 are assembled integrally at the outside of the grounded tank 3, the assembly may be inserted and attached in the grounded tank 3.

Figure 13:
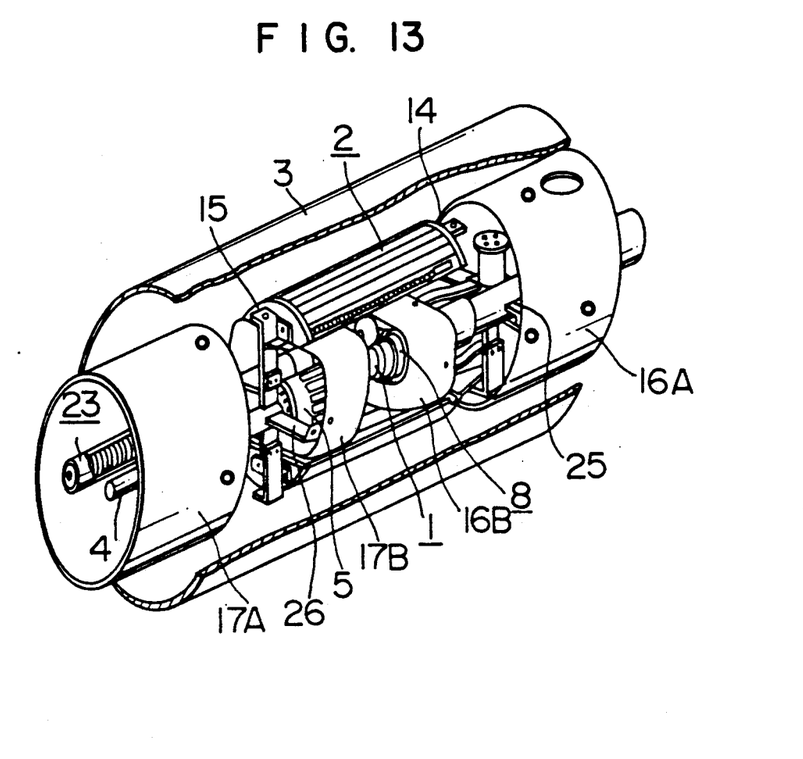
FIG. 13 is a partially cross-sectioned perspective view of another grounded-tank-type gas circuit breaker of the invention.

FIG. 13 shows another embodiment of the gas circuit breaker of the present invention. Although this embodiment is different from the embodiment illustrated by FIGS. 1 and 2 in that the cylindrical shields 16A, 17A are separate from the substantially oval small shield 16B, 17B respectively, the other structure is common to both the gas circuit breaker. Since the cylindrical shields 16A, 17A are separate from the substantially oval small shield 16B, 17B respectively, attaching of the small shields 16B, 17B, assembling of the capacitor device and attaching of the cylindrical shields becomes more easy, whether the assembling is done at the outside of the grounded tank or at the inside of the grounded tank.

Figure 14:
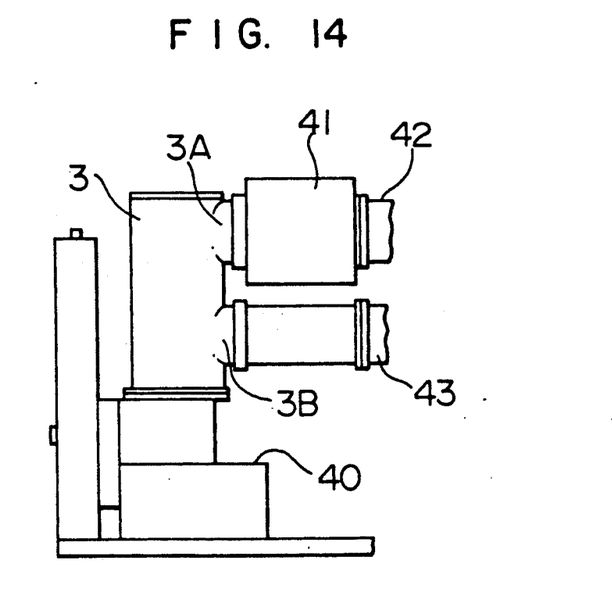
FIG. 14 is a schematic elevation view of a three-phase gas-insulating circuit breaker having vertically arranged gas circuit breakers of the invention.
Figure 15:
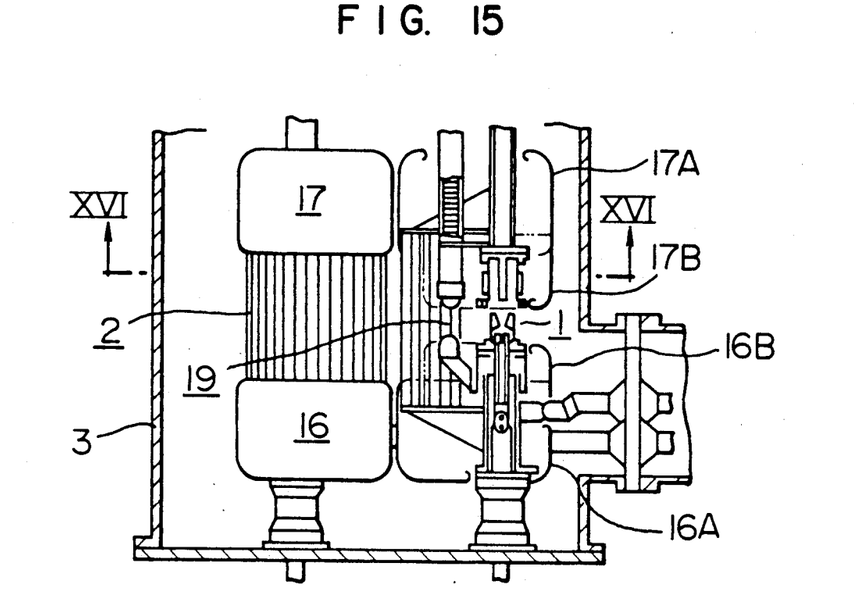
FIG. 15 is a schematic partially cross-sectioned view showing a part of the gas circuit breaker of FIG. 14.
Figure 16:
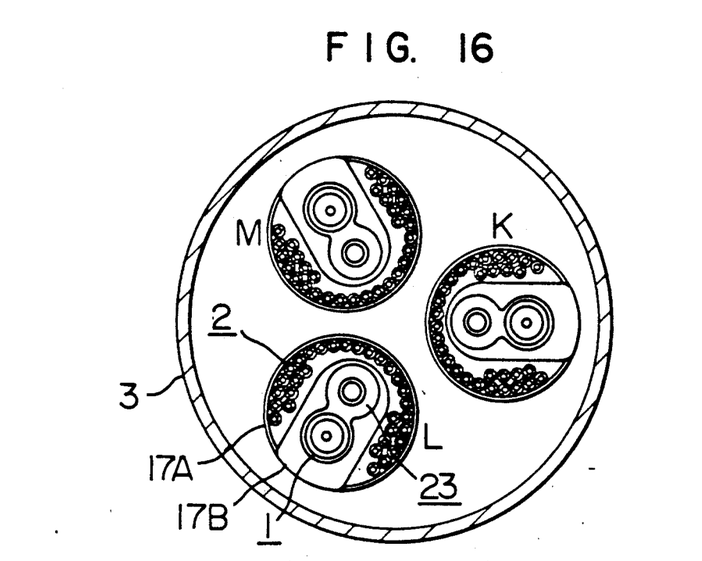
FIG. 16 is a cross-sectional view taken on line XIV—XIV of FIG. 15.

The gas circuit breaker of the present invention can be applied to a three-phase gas insulating circuit breaker. for instance, the gas insulating circuit breaker shown in FIG. 14 has a container 430 for receiving a operation device and a mechanical device and a vertical grounded tank 3 arranged on the container 40. The grounded tank has opening 3A, 3B for connecting an upper and lower circuits respectively. The upper circuit 42 includes a current transformer 41. The right side of the upper and lower circuits is not shown. The vertical grounded tank 3 is filled with an insulating gas and contains interruptor units in which the interrupting devices 1 including the main stationary and movable contacts shown in FIGS. 15 and 16, the capacitor device 2 as shown above and the resistor devices 19 including the resistor elements and the resistor stationary and movable contacts are connected in parallel. The interruptor units for interrupting three phases K, L, M respectively form equilateral triangle. The structure in the interruptor units in similar to the structure shown in FIG. 4. Since the interrupting devices are arranged at the outer side than the resistor the capacitor devices surrounding the interrupting devices are arranged at the substantially inner side than the interrupting devices, the concentration of electric field strength is decreased, the interference between the phases during interrupting is decreased and the inspection through the opening (not shown) arranged on the grounded tank 3 becomes easy.

Figure 19:
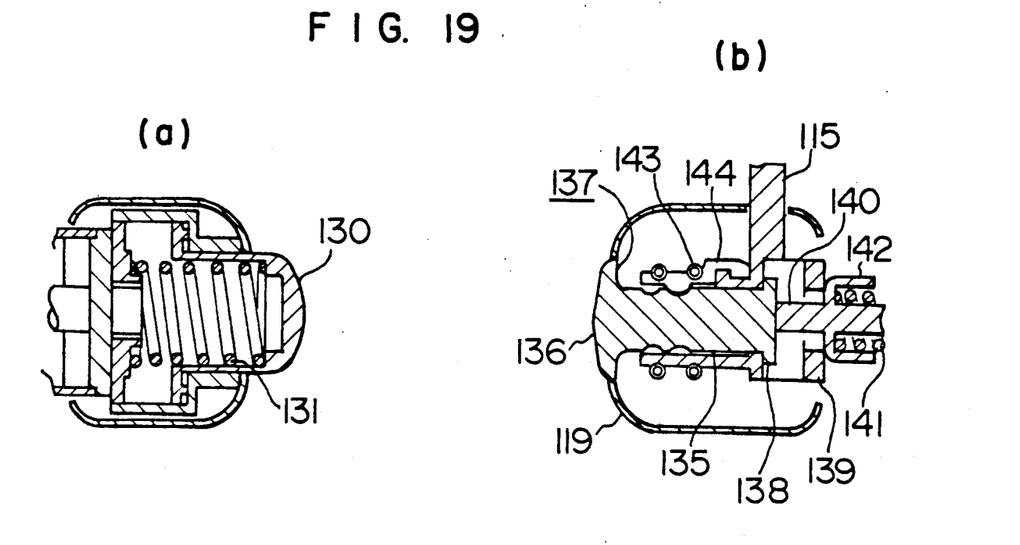
FIG. 19 cross-sectional view of a resistor device used in a grounded-tank-type gas circuit breaker of the invention, wherein the resistor device has finished interrupting.
Figure 20:
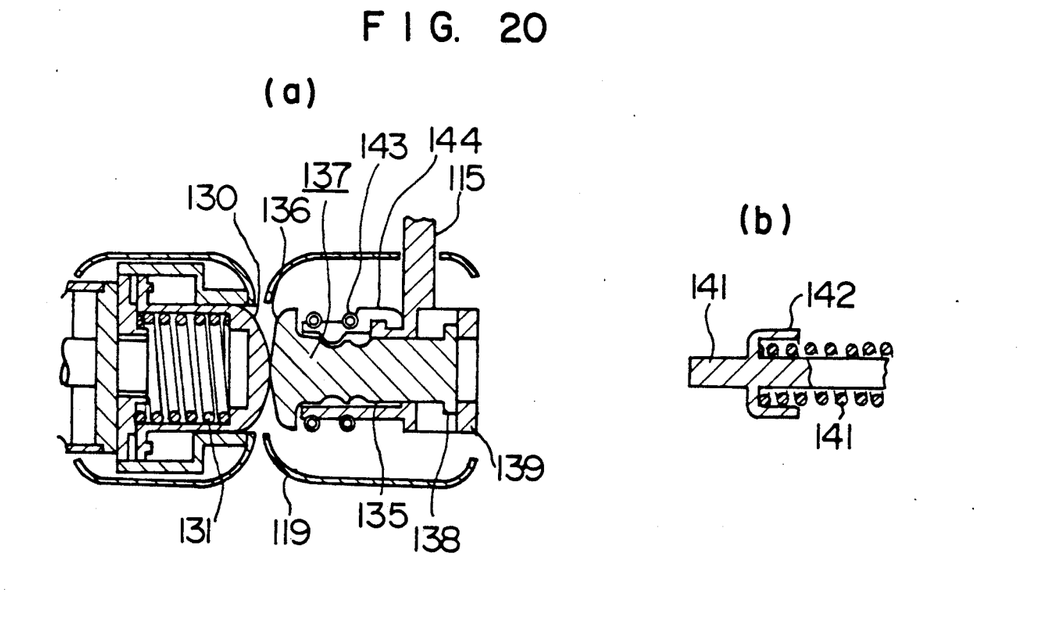
FIG. 20 is a cross-sectional view of a resistor device used in a grounded-tank-type gas circuit breaker of the invention, wherein the resistor device has finished connecting.
Figure 21:
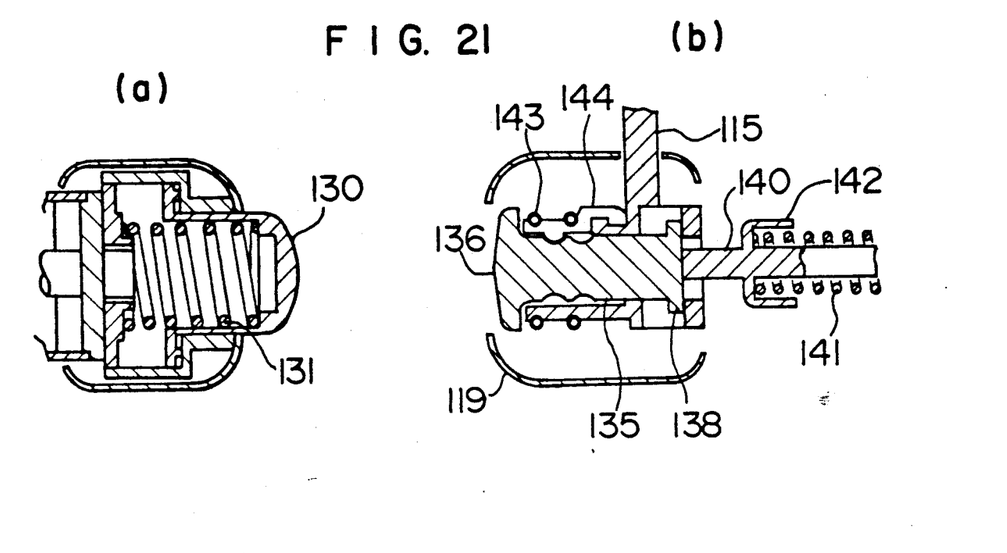
FIG. 21 is a cross-sectional view of a resistor device used in a grounded-tank-type gas circuit breaker of the invention, wherein the movable resistor contact is moving from the connecting position toward the interrupting position.

FIGS. 19 to 21 shows an embodiment of the resistor device suitable for the gas circuit breaker of the present invention.

Figure 23:
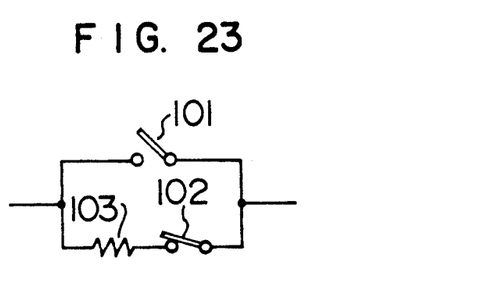
Figure 24:
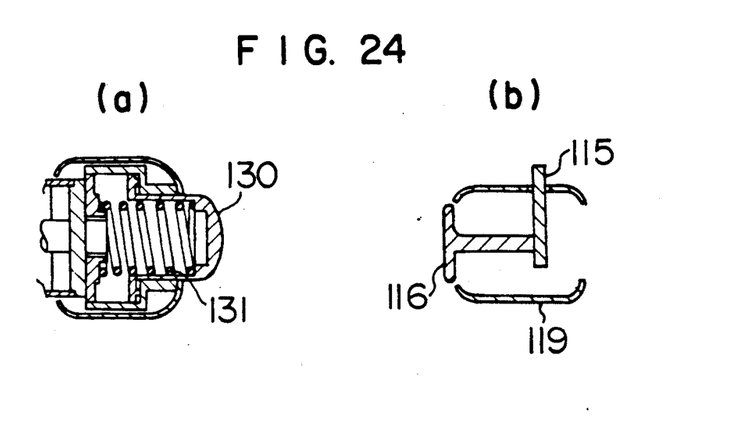
FIG. 24 is a cross-sectional view of a conventional resistor device.

FIG. 19 shows the resistor device which has started the movement for connecting. The resistor device has a stationary resistor contact 130, a shaft 135 extending through an arm 115 which extends from the movable interrupting device and a movable resistor contact 137 arranged at an end of the shaft 135 and including an electrode 136. The shaft 135 can slide in a hole of the arm 115. The left movement of the shaft 135 is limited with the arm 115 and a shaft stopper 138, and the right movement is limited with the shaft stopper 138 and a stop plate 139 which extends from the arm 115 and has an aperture. A pressing rod 140 presses the shaft stopper 138 to the left on the last movement for interrupting so that the forward end of the electrode 136 moving to the left projects beyond the left end of the shield 119 with high electric field strength between the resistor contacts. Therefore, the resistor contacts is connected with each other before the interrupting contacts is connected with each other, as shown in FIG. 23. After the resistor contacts is connected with each other, the shaft 135 of the movable resistor contact, the electrode 136 and the shaft stopper 138 are pressed to the left and are moved to the right side of the arm 115, the stop plate 139 and the shield 119. After the shaft stopper 138 and the stop plate 139 contacts with each other, the shaft 135 of the movable resistor contact, the electrode 136 and the shaft stopper 138 are moved to the left until the wipe distance of the stationary resistor contact is reached. FIG. 20 shows the resistor device which has finished the connecting.

FIG. 21 shows the resistor device which is moving from the connected position to the interrupted position. The movable resistor contact moves to the interrupted position with the arrangement that the shaft stopper 138 and the stop plate 139 contacts with each other, as shown in FIG. 21. The forward end of the electrode 136 is received in the shield 119. By such movements of the devices, the insulating characteristics between the devices are appropriately adjusted, so that the dielectric strength of the resistor device is larger than that of the interrupting device. At the last movement for interrupting, after the shaft stopper 138 contacts with the pressing rod 140, the shaft 135 and the electrode 136 is moved to the left by the movement of the interrupting device moving to the right, so that the interrupting movement is finished as shown in FIG. 19.

Figure 22:
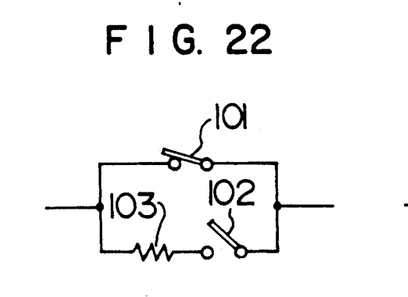
FIGS. 22 and 23 are circuit diagrams of a gas circuit breaker with a resistor device.

As above mentioned, the movable resistor contact reaches the stationary resistor contact before the movable main contact reaches the stationary main contact as shown in FIG. 23 and the movable resistor contact separates from the stationary resistor contact before the movable main contact separates from the stationary main contact as shown in FIG. 22, so that the electric field strength between the resistor contacts is larger than the electric field strength between the main contacts during the movement for connecting, and the dielectric strength of the resistor device is larger than the dielectric strength of the interrupting device during the movement for interrupting.

WHAT IS CLAIMED IS:

1. A circuit breaker comprising an interrupting device, a capacitor device, a resistor device, a shield device and a tank, the interrupting device, the resistor device and the capacitor device connected in parallel, the tank containing the interrupting device, the capacitor device, the resistor device and the shield device therein, the interrupting device comprising a stationary main contact and a movable main contact, the resistor device comprising a stationary resistor contact, a resistor element and a movable resistor contact, the stationary main contact, an end of the resistor element another end of which is connected to the stationary resistor contact and an end of the capacitor device connected to each other, the movable main contact, the movable resistor contact and the other end of the capacitor device connected to each other, the shield device comprising a first shield for shielding the stationary main contact and stationary resistor contact and a second shield for shielding the movable main contact and movable resistor contact, each of the first shield and the second shield comprising a large shield portion and a small shield portion, the small shield portions arranged between the large shield portions, the small shield portion terminating in the vicinity of the top of the main contact and in the vicinity of the top of the resistor contact, the small shield portion comprising wide portions situated substantially in the direction of an axis jointing centers of the main contact and resistor contact and narrow portions situated substantially in the direction perpendicular to the axis, the width of the narrow portions being smaller than the width of the wide portions so that a space for receiving the capacitor device between the narrow portion and the tank is enlarged, at least a part of the capacitor device arranged over the narrow portions.

2. A circuit breaker according to claim 1, wherein both ends of the capacitor device are arranged in the large shield portions respectively, and the greater part of capacitance range of the capacitor device faces to the inner surface of the tank and to the outer surface of the small shield portions.

3. A circuit breaker according to claim 1, wherein the circuit breaker comprises further at least one receiving element, the receiving element receives and surrounds the capacitor device so that the arrangement of the capacitor device is maintained correctly.

4. A circuit breaker according to claim 1, wherein the resistor device further comprises a support arm moving the movable resistor contact for connecting or interrupting, and a pressing rod, the support arm moved in accordance with the movement of the movable main contact and supporting the movable resistor contact which can slide in the support arm, the movable main contact arranged between the stationary resistor contact and the pressing rod, a total amount of a distance between the stationary resistor contact and the movable resistor contact and a distance between the pressing rod and the movable resistor contact is smaller than the stroke of the support arm so that after the stationary resistor contact have been contacted with the movable resistor contact during the movement of movable main contact for connecting, the movable resistor contact is moved by the stationary resistor contact and slides in the support arm, and after the pressing rod have been contacted with the movable resistor contact during the movement of movable main contact for interrupting, the movable resistor contact is moved by the pressing rod and slides in the support arm.

5. A circuit breaker according to claim 4, wherein the slide distance of movable resistor contact toward the pressing rod in the support arm is limited to a predetermined degree, and the stationary resistor contact is supported elasticly.

6. A multi-phase circuit breaker comprising a plurality of interruptor units and a tank for receiving the interruptor units, each of the interruptor units comprising an interrupting device, a capacitor device, a resistor device and a shield device, in each of the interruptor units, the interrupting device, the resistor device and the capacitor device connected in parallel, the interrupting device comprising a stationary main contact and a movable main contact, the resistor device comprising a stationary resistor contact, a resistor element and a movable resistor contact, the stationary main contact, an end of the resistor element another end of which is connected to the stationary resistor contact and an end of the capacitor device connected to each other, the movable main contact, the movable resistor contract and the other end of the capacitor device connected to each other, the shield device comprising a first shield for shielding the stationary main contact and stationary resistor contact and a second shield for shielding the movable main contact and movable resistor contact, each of the first shield and the second shield comprising a large shield portion and a small shield portion, the small shield portions arranged between the large shield portions, the small shield portion terminating in the vicinity of the top of the main contact and in the vicinity of the top of the resistor contact, the small shield portion comprising wide portions situated substantially in the direction of an axis joining centers of the main contact and resistor contact and narrow portions situated substantially in the direction perpendicular to the axis, the width of the narrow portions being smaller than the width of the wide portions, at least a party of the capacitor device arranged over the narrow portions, in the tank, the interrupting devices arranged at the outer side than the resistor devices in the radial direction of the tank and the capacitor devices surrounding the interrupting devices arranged at the substantially inner side than the interrupting devices.

* * * * *

UNITED STATES PATENT AND TRADEMARK OFFICE
CERTIFICATE OF CORRECTION

PATENT NO. : 5,039,831

DATED : August 13, 1991

INVENTOR(S) : Minori Sato, Kastuichi Kashimura, Masanori Tsukushi, Yukio Kurosawa, Kazuhiro Saito, Osamu Koyanagi, Isao Nishida It is certified that error appears in the above-identified patent and that said Letters Patent is hereby corrected as shown below:

On the Title Page, left-hand column, after "[22] Filed: Mar. 24, 1989" insert:

-- [30]    Foreign Application Priority Data
       March 28, 1988 [JP]   Japan .................. 63-72136
       August 8, 1988 [JP]   Japan .................. 63-195990 --

Signed and Sealed this

First Day of June, 1993

Attest:

MICHAEL K. KIRK

Attesting Officer

Acting Commissioner of Patents and Trademarks